United States Patent [19]

McGary, Jr. et al.

[11] 4,403,084

[45] Sep. 6, 1983

[54] CRYSTALLINE, GRINDABLE POLYURETHANE PREPOLYMERS

[75] Inventors: Charles W. McGary, Jr.; Delmer R. Rhodes, both of Centerville; Vincent J. Pascarella, Dayton, all of Ohio

[73] Assignee: Warner-Lambert Company, Morris Plains, N.J.

[21] Appl. No.: 357,914

[22] Filed: Mar. 15, 1982

[51] Int. Cl.$^3$ .............................................. C08G 18/80
[52] U.S. Cl. ....................................................... 528/45
[58] Field of Search ........................................... 528/45

[56] References Cited

U.S. PATENT DOCUMENTS

| | | | |
|---|---|---|---|
| 2,621,166 | 12/1952 | Schmidt et al. | 528/83 |
| 2,625,535 | 1/1953 | Mastin et al. | 528/83 |
| 2,770,612 | 11/1956 | Schollenberger | 528/83 |
| 2,899,411 | 8/1959 | Schollenberger | 528/76 |
| 2,968,575 | 1/1961 | Mallonee | 528/83 |
| 2,998,403 | 8/1961 | Müller et al. | 528/76 |
| 3,591,561 | 7/1971 | Kazama | 528/80 |
| 3,684,770 | 8/1972 | Meisert et al. | 528/76 |
| 3,689,443 | 9/1972 | Fensch | 528/80 |
| 3,804,812 | 4/1974 | Koroscil | 528/65 |
| 3,846,378 | 11/1974 | Griswold | 528/45 |
| 3,857,818 | 12/1974 | Frizelle | 528/45 |
| 3,917,741 | 11/1975 | McGarr | 528/85 |
| 4,131,604 | 12/1978 | Szycher | 528/79 |
| 4,252,923 | 2/1981 | König et al. | 525/408 |
| 4,284,745 | 8/1981 | Meyer et al. | 525/408 |

OTHER PUBLICATIONS

Polymers in Medicine & Surgery, Kronenthal, et al., Plenum Press, vol. 8, pp. 45 etc.

*Primary Examiner*—Maurice J. Welsh
*Attorney, Agent, or Firm*—Biebel, French & Nauman

[57] ABSTRACT

A crystalline grindable end-blocked prepolymer useful in providing a polyurethane elastomer having a 100% modulus less than approximately 250 psi, tensile of 3500 to 6500 psi, and less than 30% initial tensile set, said prepolymer being the product of reacting an organic polyisocyanate, a long chain crystalline diol having an average molecular weight of approximately 500 to 5000, a polyhydroxy cross-linking agent, and an end-blocking agent.

30 Claims, No Drawings

CRYSTALLINE, GRINDABLE POLYURETHANE PREPOLYMERS

BACKGROUND OF THE INVENTION

The present invention relates to a class of crystalline and grindable prepolymers which polymerize to a soft, low modulus, essentially non-crystalline thermosetting polyurethane.

While polyurethane prepolymers are known, and while it is also known to prepare polyurethane prepolymers by end blocking the isocyanate functionality with a heat reversible end blocking agent, conventional prepolymers have not been grindable and, at the same time, polymerizable to soft, flexible, but durable polyurethane films.

Griswold, U.S. Pat. No. 3,846,378 discloses a process for producing polyurethane prepolymers by a so called synchronous partial blocking process wherein the prepolymers are end-blocked with an oxime by mixing the oxime and a long chain polyol and reacting the mixture with an organic polyisocyanate in the presence of a polymerization catalyst. These prepolymers, however, do not appear to be good film formers or capable of being ground to a powder for use in powder coating.

Thus, there is a need, for a grindable prepolymer which provides a soft, elastic, low modulus polyurethane.

SUMMARY OF THE INVENTION

A principal object of the present invention is to provide a crystalline grindable polyurethane prepolymer which is polymerizable to a soft, low modulus thermosetting polyurethane having a 100% modulus less than approximately 250 psi.

Another object of this invention is to provide an oxime end blocked prepolymer which is useful in film forming processes where a low modulus thermosetting film is desired wherein the prepolymer is polymerizable to the full polymer in a relatively short cure time and at relatively low temperatures.

A related object of this invention is a crystalline polyurethane prepolymer which cures to an essentially non-crystalline and low modulus polyurethane.

These and other objects of the present invention are achieved in a crystalline end-blocked polyurethane prepolymer which is the product of reacting an organic polyisocyanate, a long chain crystalline polyol having an average molecular weight of approximately 500 to 5000, a polyhydroxy cross-linking agent and a short chain diol extender, and which affords a thermosetting essentially non-crystalline polyurethane characterized by a 100% modulus less than approximately 250 psi, initial tensile set less than approximately 30%, and tensile in the range of approximately 3500 to 6500 psi which is preferably further characterized by a 300% modulus in the range of approximately 200 to 450 psi, elongation at break greater than approximately 600%, and tear greater than approximately 100 ppi.

Typically, the invention prepolymers are obtained by reacting approximately: 13 to 23% polyisocyanate (all percents are by weight exclusive of the end-blocking agent unless otherwise indicated), 0.75 to 6% polyhydroxy cross-linking agent, up to 3% extender, and the balance long chain polyol; the end blocking agent being used in an amount equivalent to approximately 5 to 30% of the isocyanate groups in the polyisocyanate.

The prepolymers provided in the present invention preferably have a crystalline melt point in the range of 10° to 45° C. but are polymerizable to essentially non-crystalline polymers. The crystallinity of the prepolymer is principally determined by the diol which is a long chain crystalline diol. The state of the fully cured polymer and its modulus profile are determined by a number of factors which are tied to the composition of the prepolymer including the nature of the diol, the effect of polymerization on the crystalline melting point of the diol (e.g., melting point depression), the degree of cross-linking and extension, and the amount of polyisocyanate. With appropriate amounts of polyisocyanate and cross-linking the polyurethanes obtained by reacting these prepolymers are essentially non-crystalline, low modulus thermosetting polymers.

The invention prepolymers are particularly useful where a low modulus polyurethane is desired and more particularly in powder coating processes. They can be ground to a powder (particles size ranging from about 1 to 100 microns) and used in powder coating processes such as by immersing a heated film form into a fluidized bed of a powder of the prepolymer such that the powder fuses as it contacts the form and attaches to it. By heating the powder coating, the crystalline prepolymer melts to form a thin continuous film which is polymerizable to the low modulus essentially non-crystalline polymer film described above.

Definitions

The terms defined below are used in describing the invention prepolymers.

Tear is Die C tear and measured in accordance with ASTM D624.

Tensile, modulus and elongation are measured in accordance ASTM D412-68.

Initial tensile set as used herein is the percent set as determined immediately after testing elongation in accordance with ASTM D412-68 by measuring the percent increase between 1 inch markings without allowing time for recovery.

Molecular weight per cross-link ($M_c$) is calculated as set forth in POLYURETHANES CHEMISTRY AND TECHNOLOGY, Saunders and Frisch, Robert E. Krieger Publishing Co., Huntington, New York (1978) p. 266.

The invention polyurethanes are said to be amorphous or non-crystalline when they are essentially non-crystalline and they do not crystallize appreciably at room temperature.

DETAILED DESCRIPTION OF THE INVENTION

The invention prepolymers are the end-blocked intermediates obtained by reacting a polyisocyanate, a long chain polyol, a polyhydroxy cross-linking agent and, in some cases, a diol extender, with an end-blocking agent wherein the amount of the isocyanate and the amount of the cross-linking agent are such that for the long chain polyol reacted, the polyurethane obtained is an essentially non-crystalline low modulus polyurethane having a 100% modulus less than approximately 250 psi, tensile of 3500 to 6500 psi and initial tensile set less than approximately 30%. Thus, the invention prepolymers are polymerizable to a soft, low modulus, elastic film. The polymer obtained in the present invention usually have a Shore A hardness in the range of 45 to 60.

These prepolymers are typically prepared by reacting the polyisocyanate in an amount of approximately 13 to 23% by weight and reacting a cross-linking agent in an amount that will provide a degree of cross-linking ($M_c$) of approximately 5,000 to 30,000 more preferably 8,000 to 25,000 in the fully cured polymer. Generally the invention prepolymers contain approximately 0.75 to 6% cross-linking agent and approximately 70 to 84% long chain crystalline diol (exclusive of the end blocking agent). An extender is present in the preferred embodiments in an amount up to approximately 3%. The amount of the extender is also balanced with the amount of cross-linking to obtain a polymer having low modulus and low set.

Representative polyisocyanates useful in the present invention include aromatic and alicyclic diisocyanates such as 4,4'-diphenylmethane diisocyanate (MDI), toluene diisocyanate TDI), isophorone diisocyanate (IPDI), methylene bis (4-cyclohexyl isocyanate), etc. In addition to the aforementioned diisocyanates, the invention can also be practiced using aromatic and cycloaliphatic triisocyanates and tetraisocyanates.

The long chain polyols used in the present invention are crystalline diols and may be polyether diols or polyester diols and may range in average molecular weight from approximately 500 to 5000 and preferably from 1000 to 3000. Some representative examples of the polyester diols used in the present invention are polycaprolactone glycol, poly(ethylene adipate) glycol, poly(ethylene succinate) glycol, poly(ethylene sebacate) glycol, poly(butylene adipate) glycol, etc.). Typically, the polyester glycols used in the present invention are derived from primary diols or a mixture of primary diols having 2 to 4 carbon atoms and an aliphatic dicarboxylic acid having 4 to 10 carbon atoms. These diols generally have a crystalline melt point in the range of 25° to 75° C. and preferably 30° to 55° C.

Long chain amorphous diols such as poly(ethylenebutylene adipate) glycol can be used in combination with the aforementioned crystalline diols to produce a crystalline prepolymer and are often advantageous. The presence of the amorphous diol reduces the crystalline melt point of the prepolymer such that it readily cures out to a non-crystalline film.

In one preferred embodiment a mixture of polyester glycols is used in the prepolymer for melting point depression to obtain an essentially non-crystalline polyurethane product from essentially crystalline polyols. The mixture may be one of different average molecular weight polyester glycols but is preferably a mixture of chemically different polyester polyols such as a mixture of polycaprolactone glycol and poly (ethyleneadipate) glycol.

In addition to the aforementioned poly esters glycols, polyether glycols can also be used in the present invention. Two polyether glycols that have been used with some success are 1000 and 2000 MW poly(tetramethylene ether) glycols. These polyols are commercially available as Polymeg 1000 (Quaker Oats Co., Chemical Division) and Teracol 2000 (du Pont).

The invention prepolymers preferably possess a crystalline melt point in the range of about 10° to 45° C. Prepolymers having crystalline melting points in the range of 25° to 45° C. are convenient because they are grindable and produce non-crystalline elastomers. This selection of prepolymers is limited, however, and in many cases lower modulus is available from prepolymers having melting points below room temperature. Prepolymers having crystalline melting points in the range of approximately 10° to 25° C. are useful if the prepolymer is cooled to enhance its grindability and the powder is refrigerated until it is used. The polymer properties generally obtained with the latter prepolymers are desirable.

A cross-linking agent is relied upon to reduce set as well as to minimize crystallization of the long chain diol. Polyfunctional alcohols (i.e., compounds having three or more hydroxyl groups) are preferred cross-linking agents. One that is often used is a long chain diol - short chain polyol adduct such as Union Carbide PCP-0300 (an adduct of trimethylol propane and epsilon-caprolactone available from Union Carbide). In addition to PCP-0300, other polyfunctional alcohols such as trimethylol propane, trimethylol ethane and pentaerythritol can be used. Particularly, preferred cross-linking agents are polyhydric primary alcohols having at least 3 hydroxy groups.

Various extenders can be used in the invention prepolymers. In the most typical case the extender is a short chain diol such as a straight or branched chain diol having two or six carbon atoms in the main chain, e.g., ethylene glycol, propylene glycol, 1,4 butanediol, neopentyl glycol, etc. or an alicyclic glycol having up to 10 carbon atoms, e.g., 1,4 cyclohexanediol, 1,4 dimethylol cyclohexane, etc. In the most typical case, however, the extender is 1,4 butanediol. The polymer properties tend to be superior when the extender hydroxyl groups are primary hydroxyl groups. In accordance with another embodiment of the invention, the polyurethane may be chemically cross-linked using a cross-linker which is built into the hard segment. Thus, in accordance with this embodiment the cross-linking agent doubles as the extender and is a polyol such as trimethylol propane, glycerol, etc.

One convenient method for preparing the invention prepolymers is to react a mixture of the diols and the end-blocking agent with the polyisocyanate in the presence of a polyurethane polymerization catalyst such as dibutyl tin dilaurate as taught in Griswold, U.S. Pat. No. 3,846,378. This method is also adaptable to reaction injection molding. The reaction is usually initiated at a temperature of about 50° to 70° C. and thereafter the reaction exotherm may carry the temperature to 90° C. or higher.

While any conventional polyurethane end-blocking agent is useful in the invention, prepolymers that can be readily cured at low temperatures are achieved using heat-reversible, volatile end blocking agents such as acetone oxime and methyl ethyl ketone oxime. Generally, the prepolymer is end blocked in an amount of equivalent to approximately 5 to 30% of the isocyanate groups. Within this range the amount of end-blocking can be adjusted to obtain prepolymers suitable for solution coating, reaction injection molding, powder coating etc.

The invention prepolymers are useful in production line processes wherever a low modulus thermosetting polyurethane is desired. In particular they are useful in forming low modulus polyurethane films by powder coating. For example, surgical gloves have been prepared by coating a glove form with the prepolymer removing the end blocking agent and curing to the full polymer.

For powder coating the prepolymers are ground to about 1 to 100 microns and fluidized, preferably while cooling the bed to temperatures below the crystalline melt point of the prepolymers. Due to the high adhesion of polyurethane the film form must be pretreated with a release agent such as silicon or PTFE. It is also desirable to include a silicon diol in the prepolymer such as Dow Corning Q4–3667. This is also believed to enhance the film forming character of the prepolymer.

Prepolymers having a melt point below or in the vicinity of room temperature are not grindable and they cannot be fluidized at room temperature, however, these prepolymers are often the most advantageous because they yield a very soft and flexible polyurethane films. In a preferred embodiment of the present invention polyurethane prepolymer powders prepared from one of the aforementioned low melting crystalline prepolymers are used. These prepolymers are ground by cooling them to temperatures below their crystalline melt point. After they are ground they are refrigerated. Powder coating is conducted by fluidizing the ground powder while the bed is cooled to a temperature below the crystalline melt point of the powder. The bed is typically cooled to a temperature of about 5° to 40° C. below the melt point of the particles. It has been found that cooling the bed improves fluidization by hardening the powder particles and reducing their tack. This makes the bed more uniform and provides better coating control. In fact, it is also desirable to cool the bed when using powders having crystalline melt points above room temperature to reduce tack and improve fluidization.

The powder used in the present invention may range in particle size from about 1 to 100 microns, preferably with at least 80% by weight of the particles in the range of 20 to 75 microns. Particles larger than 100 microns tend to agglomerate as they melt out on the film form and leave voids in the film.

To powder coat the film form, the form is pre-heated to a temperature at which the polymer particles will deposit on the form from a fluidized bed. As a general rule the form is heated to a temperature about 10° to 100° C. higher than the crystalline melt point of the prepolymer. The temperature of the form determines whether the powder simply attaches to the form or melts out into a continuous film. If the form is only 10° to 20° C. higher than the melting point of the prepolymer, the powder will attach to the form without melting out into a film. To produce a film directly, the temperature of the form should be at least 50° C. higher than the crystalline melt point of the prepolymer. Both practices can be used in the present invention although the latter is generally more desirable. When the powder only attaches to the form, it must be melted out by additional heating prior to curing.

The invention process can be used to form films of 3.5 mils and greater thickness and preferably of 4.5 mils and greater thickness. Film thickness is a function the temperature of the form and the time the form is immersed in the fluidized bed. Higher form temperatures quickly melt of soften the coated particles and provide greater film thickness. Using the preferred low melting prepolymers the form is pre-heated to approximately 90° to 150° C. for coating. To illustrate the effect of immersion time on film thickness, to form a film 5.0 mils thick, a form pre-heated to 105° C. may be immersed in a fluidized bed of polyurethane prepolymer 1.5 seconds. By comparison, to form a film 6.0 mils thick, a form pre-heated to 105° C. may be immersed in a fluidized bed 7 seconds.

The invention is illustrated in more detail by the following non-limiting examples.

EXAMPLE 1

A polyurethane prepolymer was prepared by mixing 10 grams of a 540 MW polycaprolactone triol (Union Carbide PCP-0300), 117 g of a 1250 MW polycaprolactone diol (Union Carbide PCP-0230), 153 g of a 2,000 MW polycaprolactone diol (Union Carbide PCP-0240), 23 g of a Dow Corning Q4–3667, 9 g of 1,4 butane diol and 6 g of acetone oxime in a suitable reactor and heating the mixture to 50° C. To this mixture was added 82 g of molten 4,4' diphenyl methane diisocyanate and 0.12 g of dibutyl tin dilaurate (M+T chemical, T-12). A crystalline polyurethane prepolymer was obtained which was polymerizable to a polymer having the properties set forth in Table I below. Unless otherwise indicated, all percents are by weight.

TABLE I

| | |
|---|---|
| Hard Segment % | 22.7 |
| $M_c$ | 16,600 |
| Long Chain Diol % | 73 |
| Cross-linking agent % | 2.5 |
| Isocyanate % | 20.8 |
| Tensile (psi) | 5,500 |
| Modulus | |
| 10% (psi) | 39 |
| 100% (psi) | 140 |
| 300% (psi) | — |
| Elongation % | 605 |
| Tear (ppi) | 115 |
| Set % | 13 |

EXAMPLES 2 AND 3

Polyurethanes prepolymers were prepared from the reactants set forth in Table II below by the procedure set forth in Example 1. The polyurethanes obtained upon removing the oxime and curing had the physical properties as shown in Table II.

TABLE II

| | Ex. 2 | Ex. 3 |
|---|---|---|
| Reactants | | |
| 540 M.W. Polycaprolactone Triol (PCP 0300) | 9 g | 13 g |
| 2000 M.W. Poly(ethylene adipate) glycol | 279 g | 237 g |
| 1000 M.W. Poly(ethylene adipate) glycol | 0 g | 30 g |
| Dow Corning Q4-3667 | 24 g | 28 g |
| 1,4 Butanediol | 10 g | 9 g |
| 4,4' Diphenylmethane Diisocyanate | 73 g | 77 g |
| Acetone Oxime | 6 g | 6 g |
| Dibutyl Tin Dilaurate | 0.12 g | 0.12 g |
| Physical Properties | | |
| Hard Segment (%) | 20.7 | 21.5 |
| $M_c$ | 17,300 | 13,200 |
| Long chain diol (%) | 75.6 | 73.8 |
| Crosslinking agent, (%) | 2.3 | 3.2 |
| Isocyanate content, (%) | 18 | 19 |
| 2 Month Physicals | | |
| Tensile (psi) | 6600 | 3800 |
| Modulus | | |
| 10% (psi) | 42 | 32 |
| 100% (psi) | 170 | 130 |
| 300% (psi) | 350 | 240 |
| 500% (psi) | 1300 | 650 |
| Elongation (%) | 750 | 690 |
| Tear (ppi) | 140 | 105 |
| Set (%) | 11 | 10 |

EXAMPLE 4

A polyether polyurethane prepolymer having the composition shown in Table III below was prepared in accordance with Example 1. The polyurethane obtained possessed a tensile strength of 4100 psi, a 10% modulus of 47 psi, a 100% modulus of 230 psi, 600 percent elongation, 140 ppi tear, and 8% initial set.

TABLE III

|  | Ex. 9 |
|---|---|
| 540 MW Polycaprolactone triol (PCP-0300 Union Carbide) | 8 g |
| 2000 MW Poly(tetramethylene ether) glycol | 31 g |
| 1,4 Butane diol | 7 g |
| 4,4' Diphenylmethane Diisocyanate | 69 g |
| Dibutyl Tin Dilaurate | 0.12 g |
| Acetone Oxime | 6 g |
| Hard Segment, (%) | 19.0 g |
| $M_c$ | 18,600 |
| Long Chain diol, (%) | 77.6% |
| Crosslinking Agent, (%) | 2.1% |
| Isocyanate Content, (%) | 17.1 |

Having described the invention in detail and by reference to specific embodiments thereof, it will be apparent that numerous modifications and variations are possible in the invention as defined by the following claims.

What is claimed is:

1. A crystalline, grindable, end-blocked prepolymer comprising the reaction product of an organic polyisocyanate, a crystalline long chain diol having an average molecular weight of approximately 500 to 5000, a polyhydroxy crosslinking agent and an end blocking agent, wherein the resulting polyurethane elastomer has a 100% modulus less than approximately 250 psi, a 300% modulus between 200 and 450 psi and tensile of about 3500 to 6500 psi.

2. The end-blocked prepolymer of claim 1 wherein said prepolymer has a crystalline melting point in the range of approximately 10° to 45° C.

3. The end-blocked prepolymer of claim 1 wherein said polyisocyanate is an aromatic or alicyclic diisocyanate.

4. The end-blocked prepolymer of claim 3 wherein said diisocyanate is reacted in an amount of approximately 13–23% by weight exclusive of the end-blocking agent.

5. The end-blocked prepolymer of claim 4 wherein said cross-linking agent is reacted in an amount sufficient to provide a cross-linking degree in the range of approximately 5000 to 30,000 $M_c$.

6. The end-blocked prepolymer of claim 5 wherein said prepolymer is additionally the product of reacting a short chain diol extender.

7. The end-blocked prepolymer of claim 5 wherein said prepolymer is polymerizable to a polyurethane having a 300% modulus of approximately 200 to 500 psi, elongation at break greater than approximately 600%, and tear greater than approximately 100 ppi.

8. The end-blocked prepolymer of claim 7 wherein said end-blocking agent is acetone oxime.

9. The end-blocked prepolymer of claim 7 wherein said long chain diol comprises a polyester glycol.

10. The end-blocked prepolymer of claim 1 wherein said organic polyisocyanate is selected from the group consisting of 4,4'-diphenylmethane diisocyanate, toluene diisocyanate, isophorone diisocyanate, and methylene bis (4-cyclohexyl isocyanate).

11. The end-blocked prepolymer of claim 1 wherein said crystalline long chain diol has an average molecular weight of about 1000 to 3000.

12. The end-blocked prepolymer of claim 10 wherein said crystalline long chain diol is selected from the group consisting of polycaprolactone glycol, poly(ethylene adipate) glycol, poly(ethylene succinate) glycol, poly(ethylene sebacate) glycol, poly(butylene adipate) glycol and mixtures thereof.

13. The end-blocked prepolymer of claim 6 wherein said short chain diol extender is 1,4-butane diol.

14. The end-blocked prepolymer of claim 1 wherein said resulting polyurethane has initial tensile set less than 30%.

15. A crystalline, grindable, end-blocked prepolymer comprising the reaction product of:
   (a) an organic polyisocyanate selected from the group consisting of 4,4'-diphenylmethane diisocyanate, toluene diisocyanate, isophorone diisocyanate, and methylene bis (4-cyclohexyl isocyanate),
   (b) a crystalline long chain diol having a molecular weight of 1000 to 5000 selected from the group consisting of polycaprolactone glycol, poly(ethylene adipate) glycol, poly(ethylene succinate) glycol, poly(ethylene sebacate) glycol, poly(butylene adipate) glycol and mixtures thereof,
   (c) a polyhydroxy crosslinking agent,
   (d) a short chain diol extender, and
   (e) an end-blocking agent wherein the resulting polyurethane elastomer has a 100% modulus less than approximately 250 psi, a 300% modulus between 200 and 450 psi and tensile of about 3500 to 6500 psi.

16. The crystalline, grindable, end-blocked prepolymer of claim 15 wherein said crystalline long chain diol is poly(ethylene adipate) glycol.

17. The end-blocked prepolymer of claim 14 wherein the crosslinking agent is reacted in an amount sufficient to provide a crosslinking degree in the range of approximately 5000 to 30,000 $M_c$.

18. The end-blocked prepolymer of claim 17 wherein the crosslinking agent is reacted in an amount sufficient to provide a crosslinking degree in the range of approximately 8000 to 25,000.

19. The end-blocked prepolymer of claim 15 wherein said polyisocyanate is present in an amount of 13–23%.

20. The end-blocked prepolymer of claim 15 wherein said long chain diol is present in an amount of 70–84%.

21. The end-blocked prepolymer of claim 15 wherein said short chain diol extender is present in an amount of up to 3%.

22. The end-blocked prepolymer of claim 15 wherein said cross-linking agent is present in an amount of 0.75 to 6%.

23. The end-blocked prepolymer of claim 15 wherein said resulting polyurethane elastomer has a Shore A hardness in the range of 45 to 60.

24. The end-blocked prepolymer of claim 15 wherein said resulting polyurethane has initial tensile set less than 30%.

25. A crystalline, grindable, end-blocked prepolymer comprising the reaction product of:
   (a) about 13 to 23% by weight of an organic polyisocyanate selected from the group consisting of 4,4'-diphenylmethane diisocyanate, toluene diisocyanate, isophorone diisocyanate, and methylene bis (4-cyclohexyl isocyanate), (b) about 70 to 84% by weight of a crystalline long chain diol having a molecular weight of 1000 to 5000 and a melting point of 30° to 55° C. selected from the group consisting of polycaprolactone glycol, poly(ethylene adipate) glycol, poly(ethylene succinate) glycol, poly(ethylene sebacate) glycol, poly(butylene adipate) glycol and mixtures thereof, (c) a polyhydroxy crosslinking agent in an amount sufficient to provide a crosslinking degree in the range of approximately 5000 to 30,000 $M_c$, (d) up to about 3% of a short chain diol extender, and (e) an end-blocking agent in an amount sufficient to block about 5 to 30% of the isocyanate groups forming said polyisocyanate wherein the resulting polyurethane elastomer has a 100% modulus less than approximately 250 psi, a 300% modulus between 200 and 450 psi and tensile of about 3500 to 6500 psi.

26. The crystalline, grindable, end-blocked prepolymer of claim 25 wherein said crystalline long chain diol is poly(ethylene adipate) glycol.

27. The end-blocked prepolymer of claim 26 wherein the crosslinking agent is reacted in an amount sufficient to provide a crosslinking degree in the range of approximately 8000 to 25,000.

28. The end-blocked prepolymer of claim 27 wherein the resulting polyurethane elastomer has a Shore A hardness in the range of 45 to 60.

29. The end-blocked prepolymer of claim 28 wherein said extender is 1,4-butanediol.

30. The end-blocked prepolymer of claim 29 wherein said resulting polyurethane has initial tensile set less than 30%.

* * * * *